US010375175B2

(12) United States Patent
Lu et al.

(10) Patent No.: US 10,375,175 B2
(45) Date of Patent: Aug. 6, 2019

(54) METHOD AND APPARATUS FOR TERMINAL APPLICATION ACCESSING NAS

(71) Applicant: ZTE CORPORATION, Shenzhen, Guangdong Province (CN)

(72) Inventors: Chunjun Lu, Shenzhen (CN); Yongming Yang, Shenzhen (CN); Fangfang Luo, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/561,071

(22) PCT Filed: Sep. 17, 2015

(86) PCT No.: PCT/CN2015/089870
§ 371 (c)(1),
(2) Date: Sep. 25, 2017

(87) PCT Pub. No.: WO2016/161774
PCT Pub. Date: Oct. 13, 2016

(65) Prior Publication Data

US 2018/0063255 A1 Mar. 1, 2018

(30) Foreign Application Priority Data

Apr. 7, 2015 (CN) .......................... 2015 1 0160837

(51) Int. Cl.
*H04L 29/08* (2006.01)
*H04L 29/12* (2006.01)

(52) U.S. Cl.
CPC ............ *H04L 67/141* (2013.01); *H04L 29/12* (2013.01); *H04L 61/256* (2013.01);
(Continued)

(58) Field of Classification Search
CPC ............... H04L 67/1097; H04L 61/256; H04L 61/2514; H04L 67/141; H04L 61/2589; H04L 61/1535
See application file for complete search history.

(56) References Cited

U.S. PATENT DOCUMENTS 9,319,467 B2 * 4/2016 Abuan ................ H04L 61/2575
2006/0190992 A1 8/2006 Li et al.
(Continued)

FOREIGN PATENT DOCUMENTS

| | | | |
|---|---|---|---|
| CN | 1968194 | A | 5/2007 |
| CN | 101217536 | A | 7/2008 |
| CN | 103179186 | A | 6/2013 |

OTHER PUBLICATIONS

Ford et al., Peer-to-Peer Communication Across Network Address Translators, Feb. 17, 2005, pp. 1-25. (Year: 2005).*
(Continued)

*Primary Examiner* — Vivek Srivastava
*Assistant Examiner* — Muhammad Raza
(74) *Attorney, Agent, or Firm* — McDonald Hopkins LLC

(57) ABSTRACT

Embodiments of the present disclosure disclose a method and an apparatus for a terminal application to access a NAS. The method includes: when a request for a terminal application to access a NAS is received, sending an establishment request for a hole punching connection to the NAS, and receiving an establishment request for a hole punching connection sent by the terminal application; and after the hole punching connection with the terminal application and the hole punching connection with the NAS are successfully established, completing data transmission between the terminal application and the NAS based on the successfully established hole punching connections.

4 Claims, 6 Drawing Sheets

(52) U.S. Cl.
CPC ...... *H04L 61/2514* (2013.01); *H04L 61/2553* (2013.01); *H04L 67/1097* (2013.01); *H04L 61/2007* (2013.01)

(56) References Cited

U.S. PATENT DOCUMENTS

2009/0323559 A1* 12/2009 Chen ................. H04L 29/12377 370/259
2010/0263039 A1* 10/2010 Yeh ....................... H04L 29/125 726/11
2011/0252238 A1* 10/2011 Abuan ................ H04L 61/2575 713/168
2012/0072548 A1* 3/2012 Kim .................... H04L 61/1535 709/219
2012/0265828 A1* 10/2012 Slepinin .............. H04L 63/0428 709/206
2014/0324950 A1* 10/2014 Lee ....................... H04L 67/141 709/203
2015/0134843 A1* 5/2015 Hsieh .................... H04L 67/104 709/228
2016/0173444 A1* 6/2016 Nistor ................... H04L 61/256 709/224

OTHER PUBLICATIONS

Srisuresh et al. RFC 5128: State of Peer-to-Peer (P2P) Communication across Network Address Translators (NATs), Mar. 2008, The IETF Trust, pp. 1-32. (Year: 2008).*
TCP hole punching, Wikipedia, Mar. 23, 2015. (Year: 2015).*
UDP hole punching, Wikipedia, Mar. 29, 2015. (Year: 2015).*
Maier et al., NAT Hole Punching Revisited, 2011, IEEE, 36th Annual IEEE Conference on Local Computer Networks, pp. 147-150. (Year: 2011).*
P. Srisuresh et al, State of Peer-to-Peer (P2P) Communication across Network Address Translators (NATs), Network working Group; Mar. 2008. XP55426134A.

* cited by examiner

METHOD AND APPARATUS FOR TERMINAL APPLICATION ACCESSING NAS

TECHNICAL FIELD

Embodiments of the present disclosure relate to but not limited to the technical field of Internet, in particular to a method and an apparatus for a terminal application to access a NAS.

BACKGROUND

With the development and popularization of information technology, the demands of enterprises or families for data storage continuously increase. As a kind of network storage devices for providing data storage and file share services, NAS (Network Attached Storage) devices are more widely applied. As compared with that a public network IP address may be allocated for a NAS when the NAS is deployed by an enterprise, a home user generally deploys a NAS in a home local area network. The NAS deployed at home has no public network IP address, i.e., a home gateway is used as a NAT (Network Address Translation) device and an internal network IP is only allocated to the NAS. If it is expected to directly access the NAS over the Internet, the NAT device must be traversed. According to different access features, NAT may be divided into the following four types.

1. Full Cone NAT

For full core NAT, all requests which are sent from the same internal network IP and port number will be mapped to the same external network IP and port number, and any one of external network hosts can send packets to this internal network host through this mapped external IP and port number. As illustrated in FIG. 1, address pairs of an external network mapped by a private network address pair {X, y} are all {A, b}, and all hosts such as W, P and S on the external network can access {X, y} in the private network through {A, b}.

2. Restricted Cone NAT

For restricted cone NAT, as well, all requests which are sent from the same internal network IP and port number will be mapped to the same external network IP and port number. Different from the full cone NAT, external network hosts can only send packets to internal network hosts which previously had already sent data packets thereto. As illustrated in FIG. 2, address pair of the external network mapped by a private network address pair {X, y} are {A, b}, and packets of an external network P can only access {X, y} in a private network through {A, b}. As long as private network address pair is {X, y}, the mapped address pair will not change during outward connection, i.e., is {A, b}. In other words, if P is not connected with {X, y}, the mapped addresses of other external networks connected with {X, y} are still {A, b}.

3. Port Restricted Cone NAT

Port restricted cone NAT is very similar to the restricted cone NAT, and the difference lies in that it includes a port number. As illustrated in FIG. 3, if an external network host with an IP address X and a port P wants to send a packet to an internal network host, it is required that this internal network host previously had sent a data packet to the external network host with the IP address X and the port P. Address pairs of the external network mapped by a private network address pair {X, y} are {A, b} (bound), and packets of external networks with an address {P, q} can access {X, y} in a private network through {A, b}.

4. Symmetric NAT

For symmetric NAT, all requests which are sent from the same internal network IP and port number to a specific destination IP and port number will be all mapped to the same IP and port number. If the same host sends packets to different destination addresses by using the same source address and port number, NAT will use different mappings. Besides, external network hosts which receive data can only oppositely send packets to the internal network host. As illustrated in FIG. 4, address pairs of the external network mapped by a private network address pair {X, y} are {A, b}, and a binding is {X, y}|{A, b}← →{P, q}, and then NAT only receives packets from {P, q} and forwards the packets to {X, y}. When a client requests for one different public network address and port, a port number {C, d} will be newly allocated. Symmetric NAT is more complex than the above-mentioned several types of NAT. Regardless of private network address pair or public network address pair, as long as one party changes, the mapped address certainly changes, too.

In view of the above-mentioned different types of NATs, in NAT traversing solutions of the related technology, two detection servers will be deployed according to requirements of definition of the above-mentioned types of NATs. Firstly the type of NAT is detected, and then different NAT traversing solutions are implemented according to the type of NAT. However, in the above-mentioned NAT traversing solutions, since two detection servers need to be deployed, the cost in accessing NAS is increased and the efficiency of accessing NAS is low.

SUMMARY

The following is a summary of the subject described in detail in this document. This summary is not used for limiting the protection scope of the claims.

Embodiments of the present disclosure provide a method and an apparatus for a terminal application to access a NAS, which can solve the problems that the cost in accessing the NAS increases and the efficiency of accessing the NAS is low since two detection servers need to be deployed in NAT traversing solutions of the related technology.

An embodiment of the present disclosure provides a method for a terminal application to access a NAS, including steps as follows:

when receiving a request for a terminal application to access a NAS, sending an establishment request for a hole punching connection to the NAS, and receiving an establishment request for a hole punching connection sent by the terminal application; and after the hole punching connection with the terminal application and the hole punching connection with the NAS are successfully established, completing data transmission between the terminal application and the NAS based on successfully established hole punching connections.

In an exemplary embodiment, before the step of completing data transmission between the terminal application and the NAS based on successfully established hole punching connections, the method further includes:

extracting information about a port of the NAS for establishing the hole punching connection;

sending the information about the port of the NAS for establishing the hole punching connection to the terminal application, such that the terminal application monitors a port of the terminal application for establishing the hole punching connection and sends a hole punching connection request to the port of the NAS for establishing the hole punching connection; and when the terminal application monitors that the port of the terminal application for establishing the hole punching connection has a connection which is established and/or a hole punching connection corresponding to the hole punching connection request sent to the NAS is successfully established, judging that the hole punching connection with the terminal application is successfully established.

In an exemplary embodiment, before the step of completing data transmission between the terminal application and the NAS based on successfully established hole punching connections, the method further includes:

extracting information about a port of the terminal application for establishing the hole punching connection;

sending the information about the port of the terminal application for establishing the hole punching connection to the NAS, such that the NAS detects a port of the NAS for establishing the hole punching connection and sends a hole punching connection request to the port of the terminal application for establishing the hole punching connection; and when the NAS monitors that the port of the NAS for establishing the hole punching connection has a connection which is established and/or a hole punching connection corresponding to the hole punching connection request sent to the terminal application is successfully established, judging that the hole punching connection with the NAS is successfully established.

In an exemplary embodiment, before the step of completing data transmission between the terminal application and the NAS based on successfully established hole punching connections, the method further includes:

when a NAT environment of the terminal application and a NAT environment of the NAS are a symmetric NAT environment, judging that the hole punching connection with the terminal application and the hole punching connection with the NAS are unsuccessfully established.

In an exemplary embodiment, the method further includes:

when the hole punching connection with the terminal application and the hole punching connection with the NAS are both unsuccessfully established, receiving a relay connection request sent by the terminal application and sending a request for establishing a relay connection to the NAS; and establishing a relay connection with the terminal application and a relay connection with the NAS respectively, and completing data transmission between the terminal application and the NAS based on the relay connections.

Besides, an embodiment of the present disclosure further provides an apparatus for a terminal application to access a NAS, including:

a receiving and sending module configured to, when receiving a request for a terminal application to access a NAS, send an establishment request for a hole punching connection to the NAS, and receive an establishment request for a hole punching connection sent by the terminal application; and a data interaction module configured to, after the hole punching connection with the terminal application and the hole punching connection with the NAS are successfully established, complete data transmission between the terminal application and the NAS based on successfully established hole punching connections.

In an exemplary embodiment, the apparatus for a terminal application to access a NAS further includes a monitoring module including an extracting unit, a sending unit and a monitoring unit.

The extracting unit is configured to extract information about a port of the NAS for establishing the hole punching connection.

The sending unit is configured to send the information about the port of the NAS for establishing the hole punching connection to the terminal application such that the terminal application monitors a port of the terminal application for establishing the hole punching connection and sends a hole punching connection request to the port of the NAS for establishing the hole punching connection.

The monitoring unit is configured to, when the terminal application monitors that the port of the terminal application for establishing the hole punching connection has a connection which is established and/or a hole punching connection corresponding to the hole punching connection request sent to the NAS is successfully established, judge that the hole punching connection with the terminal application is successfully established.

In an exemplary embodiment, the extracting unit is further configured to extract information about a port of the terminal application for establishing the hole punching connection.

The sending unit is further configured to send the information about the port of the terminal application for establishing the hole punching connection to the NAS such that the NAS detects a port of the NAS for establishing the hole punching connection and sends a hole punching connection request to the port of the terminal application for establishing the hole punching connection.

The monitoring unit is further configured to, when the NAS monitors that the port of the NAS for establishing the hole punching connection has a connection which is established and/or a hole punching connection corresponding to the hole punching connection request sent to the terminal application is successfully established, judge that the hole punching connection with the NAS is successfully established.

In an exemplary embodiment, the monitoring unit is further configured to, when a NAT environment of the terminal application and a NAT environment of the NAS is a symmetric NAT environment, judge that the hole punching connection with the terminal application and the hole punching connection with the NAS are unsuccessfully established.

In an exemplary embodiment, the apparatus for a terminal application to access the NAS further includes an establishing module.

The receiving and sending module is further configured to, when the hole punching connection with the terminal application and the hole punching connection with the NAS are both unsuccessfully established, receive a relay connection request sent by the terminal application and send a request for establishing a relay connection to the NAS.

The establishing module is configured to establish a relay connection with the terminal application and a relay connection with the NAS respectively.

The data interaction module is further configured to complete data transmission between the terminal application and the NAS based on the relay connections.

An embodiment of the present disclosure further provides a computer-readable storage medium where program instructions are stored. When executed, the program instructions are capable of implementing the method.

By establishing the hole punching connection through one detection server between the terminal application and the NAS and further completing data transmission between the terminal application and the NAS through the hole punching connection, the embodiments of the present disclosure realize the access of the terminal application to the internal network NAS, reduce the cost in accessing the NAS and improves the efficiency of accessing the NAS.

After the drawings and the detailed description are read and understood, other aspects can be understood.

DETAILED DESCRIPTION

The technical solution provided by the embodiment of the present disclosure includes the following steps. When a request of a terminal application accessing a NAS is received, an establishment request for a hole punching connection is sent to the NAS, and an establishment request for a hole punching connection sent by the terminal application is received. After the hole punching connection with the terminal application and the hole punching connection with the NAS are successfully established, data transmission between the terminal application and the NAS is completed based on the successfully established hole punching connections. By establishing the hole punching connections between the terminal application and the NAS through one detection server to further complete data transmission between the terminal application and the NAS through the hole punching connections, the access of the terminal application to the internal network NAS is realized, and the cost in accessing the NAS is reduced and the efficiency of accessing the NAS is improved.

The embodiments of the present disclosure will be described below with reference to the drawings. It needs to be stated that the following embodiments and the features in the embodiments may be mutually and freely combined under a situation of no conflict.

Embodiment One

An embodiment of the present disclosure provides a method for a terminal application to access a NAS.

Figure 5:
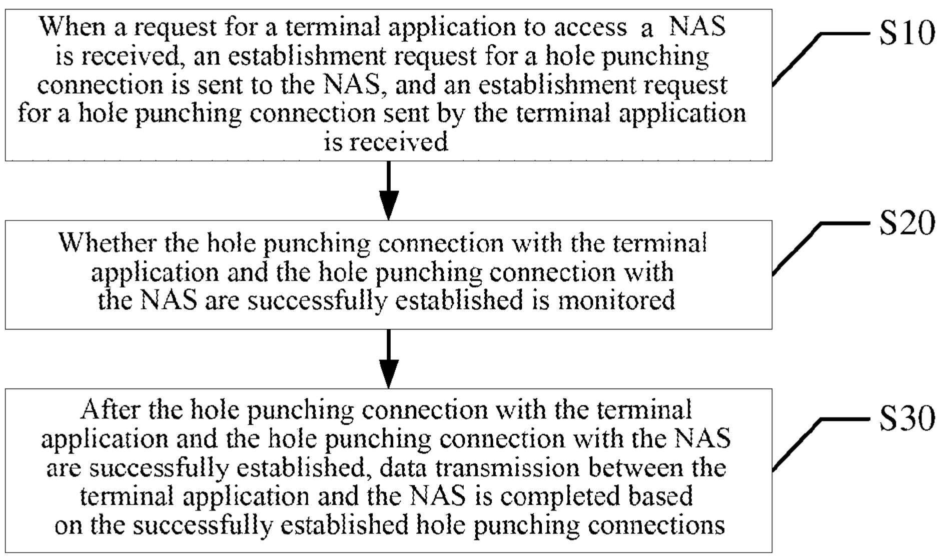
FIG. 5 illustrates a flowchart of a method for a terminal application to access a NAS according to embodiment one of the present disclosure.

Referring to FIG. 5, it illustrates a flowchart of a method for a terminal application to access a NAS according to embodiment one of the present disclosure. As illustrated in FIG. 5, the method for the terminal application to access the NAS includes the following steps S10-S20.

In step S10, when a request for a terminal application to access a NAS is received, an establishment request for a hole punching connection is sent to the NAS, and an establishment request for a hole punching connection sent by the terminal application is received.

One detection server is provided. The terminal application may complete the establishment of the hole punching connection with the NAS through the detection server, and complete data transmission between the terminal application and the NAS based on the established hole punching connection to realize the access of the terminal application to the NAS.

When a terminal user needs to access a NAS deployed in an internal network, a request for accessing the NAS is sent to the server, and the server judges whether the terminal application has already established a hole punching connection with the NAS. When the terminal application has already established the hole punching connection with the NAS, data transmission between the terminal application and the NAS may be completed directly through the established hole punching connection. When the hole punching connection has not been established, an establishment request for a hole punching connection with the NAS is initiated to the server, and after the server receives the request for establishing the hole punching connection with the NAS, the server sends an establishment request for a hole punching connection to the NAS and receives an establishment request for a hole punching connection sent by the terminal application. Herein, the establishment request is a request for establishing a hole punching connection with the server. The server establishes the hole punching connection with the NAS and establishes the hole punching connection with the terminal application.

In step S20, whether the hole punching connection with the terminal application and the hole punching connection with the NAS are successfully established is monitored.

The server establishes the hole punching connection with the terminal application and establishes the hole punching connection with the NAS. The server notifies the terminal application of information including the public network IP and port of the NAS for hole punching and the public network IP and port of the terminal application for hole punching, and notifies the NAS of information including the public network IP and port of the NAS for hole punching and the public network IP and port of the terminal application for hole punching.

Figure 6:
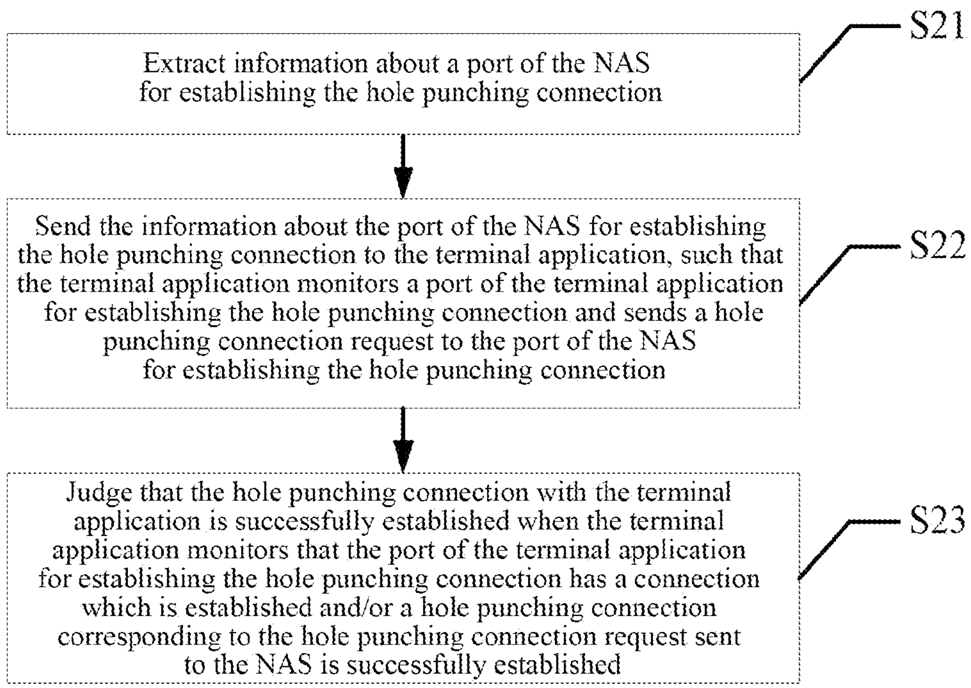
FIG. 6 illustrates a flowchart of monitoring whether a hole punching connection with a terminal application is successfully established according to embodiment one of the present disclosure.

Referring to FIG. 6, the process of monitoring whether the hole punching connection with the terminal application has already been successfully established may include the following steps S21-S23.

In step S21, information about a port of the NAS for establishing the hole punching connection is extracted.

In step S22, the information about the port of the NAS for establishing the hole punching connection is sent to the terminal application such that the terminal application monitors a port of the terminal application for establishing the hole punching connection and sends a hole punching connection request to the port of the NAS for establishing the hole punching connection.

In step S23, when the terminal application monitors that the port of the terminal application for establishing the hole punching connection has a connection which is established and/or the hole punching connection corresponding to the hole punching connection request sent to the NAS is successfully established, it is judged that the hole punching connection with the terminal application is successfully established.

The terminal application is bound to a local hole punching port and monitors the local hole punching port, and simultaneously initiates a hole punching connection request to the hole punching port of the NAS. The terminal application checks whether the monitored hole punching port has a connection which is established, and simultaneously checks whether the hole punching connection initiated to the NAS is successfully established. It is judged that the hole punching connection with the NAS is successfully established when one of the two is successfully established. For example, when the monitored hole punching port has a connection which is established or the hole punching connection initiated to the NAS is successfully established, it is judged that the hole punching connection with the NAS is successfully established. Information about that the hole punching connection with the NAS is successfully established is fed back to the server to inform the server about the monitored situation of the establishment of the hole punching connection with the NAS.

Figure 7:
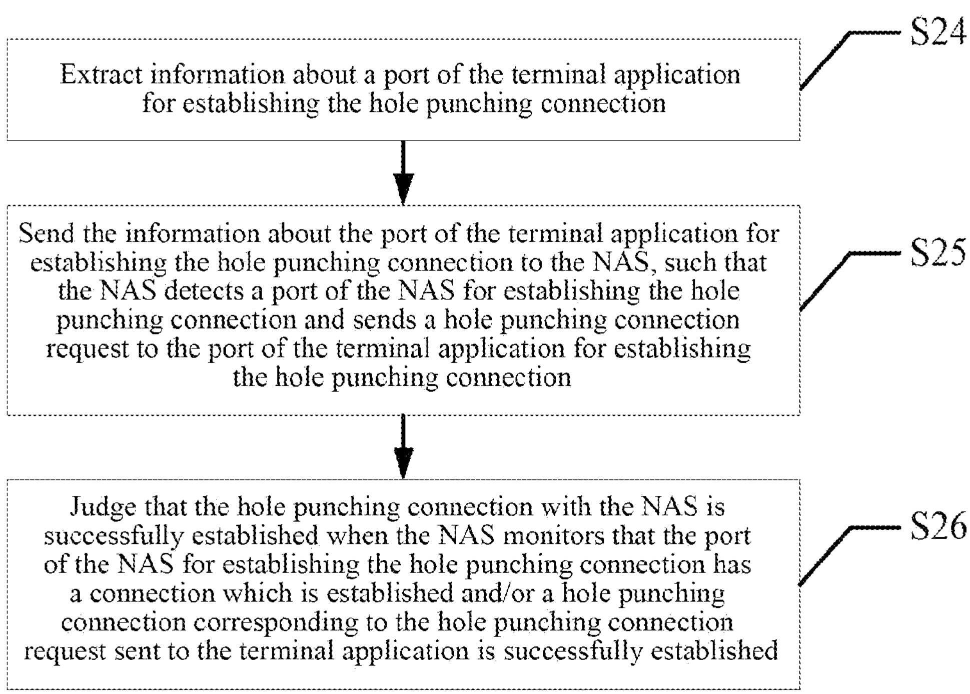
FIG. 7 illustrates a flowchart of monitoring whether a hole punching connection with a NAS is successfully established according to embodiment one of the present disclosure.

Referring to FIG. 7, the process of monitoring whether the hole punching connection with the NAS has already been successfully established may include the following steps S24-S26.

In step S24, information about a port of the terminal application for establishing the hole punching connection is extracted.

In step S25, the information about the port of the terminal application for establishing the hole punching connection is sent to the NAS such that the NAS detects a port of the NAS for establishing the hole punching connection and sends a hole punching connection request to the port of the terminal application for establishing the hole punching connection.

In step S26, when the NAS monitors that the port of the terminal application for establishing the hole punching connection has a connection which is established and/or the hole punching connection corresponding to the hole punching connection request sent to the terminal application is successfully established, it is judged that the hole punching connection with the NAS is successfully established.

The NAS is bound to a local hole punching port and monitors the local hole punching port, and simultaneously initiates a hole punching connection request to the hole punching port of the terminal application. The NAS checks whether the monitored hole punching port has a connection which is established and simultaneously checks whether the hole punching connection initiated to the terminal application is successfully established. It is judged that the hole punching connection with the terminal application is successfully established when one of the two is successfully established. For example, when the monitored hole punching port has a connection which is established or the hole punching connection initiated to the terminal application is successfully established, it is judged that the hole punching connection with the terminal application is successfully established. Information about that the hole punching connection with the terminal application is successfully established is fed back to the server to inform the server about the monitored situation of the establishment of the hole punching connection with the terminal application. In this embodiment, by simultaneously initiating the hole punching connections with the terminal application and the NAS to try traversing, the traversing efficiency and the success rate of the hole punching connection are improved.

Figure 8:
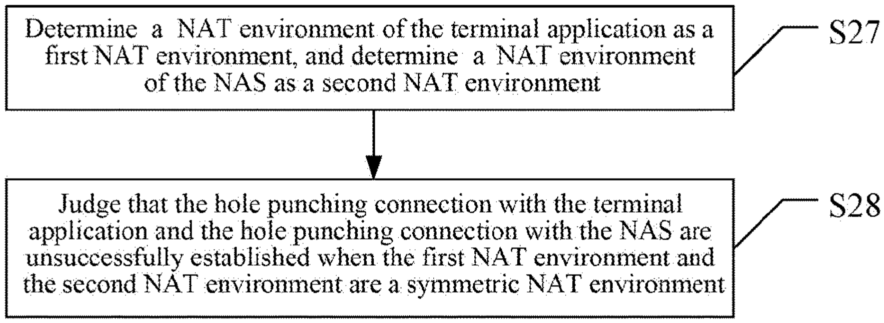
FIG. 8 illustrates a flowchart of monitoring whether a hole punching connection with a terminal application and a hole punching connection with a NAS are successfully established according to embodiment one of the present disclosure.

Referring to FIG. 8, the process of monitoring whether the hole punching connection with the terminal application and the hole punching connection with the NAS are successfully established may include the following steps.

In step S27, a NAT environment of the terminal application is determined as a first NAT environment and a NAT environment of the NAS is determined as a second NAT environment.

In step S28, when the first NAT environment and the second NAT environment are a symmetric NAT environment, it is judged that the hole punching connection with the terminal application and the hole punching connection with the NAS are unsuccessfully established.

The establishment of the above-mentioned hole punching connections has certain requirements for NAT network environments. For example, if one of the terminal application and the NAS is located in an asymmetric NAT environment, the hole punching connection can be successfully established; and if the terminal application and the NAS are both located in a symmetric NAT network environment, the hole punching connection cannot be successfully established. When the server determines that the NAT environment of the terminal application and the NAT environment of the NAS are both a symmetric NAT environment, the establishment of the hole punching connection between the NAS and the terminal application cannot be realized, i.e., it is judged that the hole punching connection with the terminal application and the hole punching connection with the NAS are unsuccessfully established.

In other embodiments of the present disclosure, what may further be included is that before the server establishes the hole punching connection with the terminal application and establishes the hole punching connection with the NAS, the server firstly determines whether the NAT environments of the NAS and the terminal application are suitable for the establishment of the hole punching connections. If not, hole punching connections will not be established. If yes, the hole punching connections will be established, and then whether the hole punching connections can be successfully established is judged.

In step S30, after the hole punching connection with the terminal application and the hole punching connection with the NAS are successfully established, data transmission between the terminal application and the NAS is completed based on the successfully established hole punching connections.

After the hole punching connection between the terminal application and the NAS is successfully established, the hole punching connection may be used for data transmission, i.e., P2P data transmission between the terminal application and the NAS is performed. By establishing the hole punching connection between the terminal application and the NAS, the NAS may be remotely accessed, and only one detection server needs to be added, thereby reducing the cost in accessing the NAS.

Figure 9:
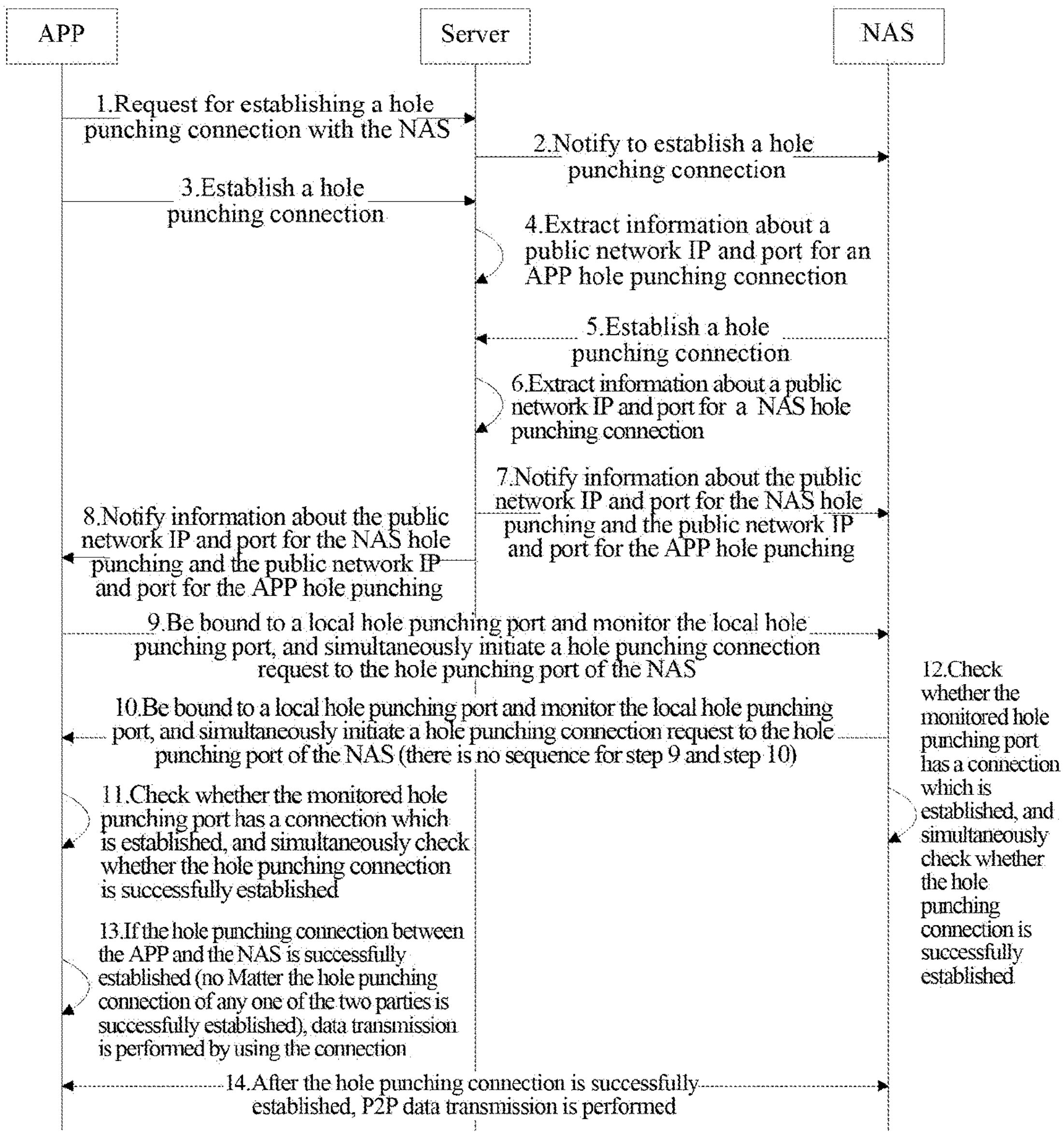
FIG. 9 illustrates a flowchart of a hole punching connection according to embodiment one of the present disclosure.

To better describe the process of the method for the terminal application to access the NAS provided by the embodiment of the present disclosure, referring to FIG. 9, the process of a hole punching connection includes the following steps.

1: When the terminal application APP needs to access the NAS, the terminal application APP initiates an establishment request for a hole punching connection with the NAS to the server.

2: The server notifies the NAS to establish a hole punching connection.

3: The APP establishes a hole punching connection with the server.

4: The server extracts information about a public network IP and port for an APP hole punching connection.

5: The NAS establishes a hole punching connection with the server.

6: The server extracts information about a public network IP and port for a NAS hole punching connection.

7: The server notifies the NAS of information including the public network IP and port of the NAS for hole punching, the public network IP and port of the APP for hole punching, etc.

8: The server notifies the APP of information including the public network IP and port of the NAS for hole punching, the public network IP and port of the APP for hole punching, etc.

9: The APP is bound to a local hole punching port and monitors the local hole punching port, and simultaneously initiates a connection request to the hole punching port of the NAS.

10: The NAS is bound to a local hole punching port and monitors the local hole punching port, and simultaneously initiates a connection request to the hole punching port of the APP (there is no sequence for step 9 and step 10).

11: The APP checks whether the monitored hole punching port has a connection which is established, and simultaneously checks whether the hole punching connection is successfully established, and it is ok as long as one of the two is successfully established.

12: The NAS checks whether the monitored hole punching port has a connection which is established, and simultaneously checks whether the hole punching connection is successfully established, and it is ok as long as one of the two is successfully established.

13: If the hole punching connection between the APP and the NAS is successfully established (no matter the hole punching connection of any one of the two parties is successfully established), data transmission may be performed by using the connection.

14: After the hole punching connection is successfully established, P2P data transmission is performed between the APP and the NAS.

One server is deployed on a public network to provide hole punching and relay services, and acts as a "intermediary" between the mobile phone APP and the NAS. A home NAS is deployed under a home gateway, and sends a UDP heartbeat keep-alive packet to the server, and thus the server can obtain the public network IP address and port of the NAS after the NAT. If the server wants to request to access the NAS, a packet is sent to the above-mentioned IP address and port. When the mobile phone APP wants to access the NAS, firstly a hole punching process is tried to establish a P2P (Peer to Peer) connection with the NAS and perform data transmission. If the P2P connection is unsuccessfully established, data transmission between the mobile phone APP and the NAS is performed through a relay connection process.

In this embodiment, by establishing the hole punching connection through one detection server between the terminal application and the NAS and further completing data transmission between the terminal application and the NAS through the hole punching connection, the access of the terminal application to the internal network NAS is realized, and the cost in accessing the NAS is reduced and the efficiency of accessing the NAS is improved.

Embodiment Two

Figure 10:
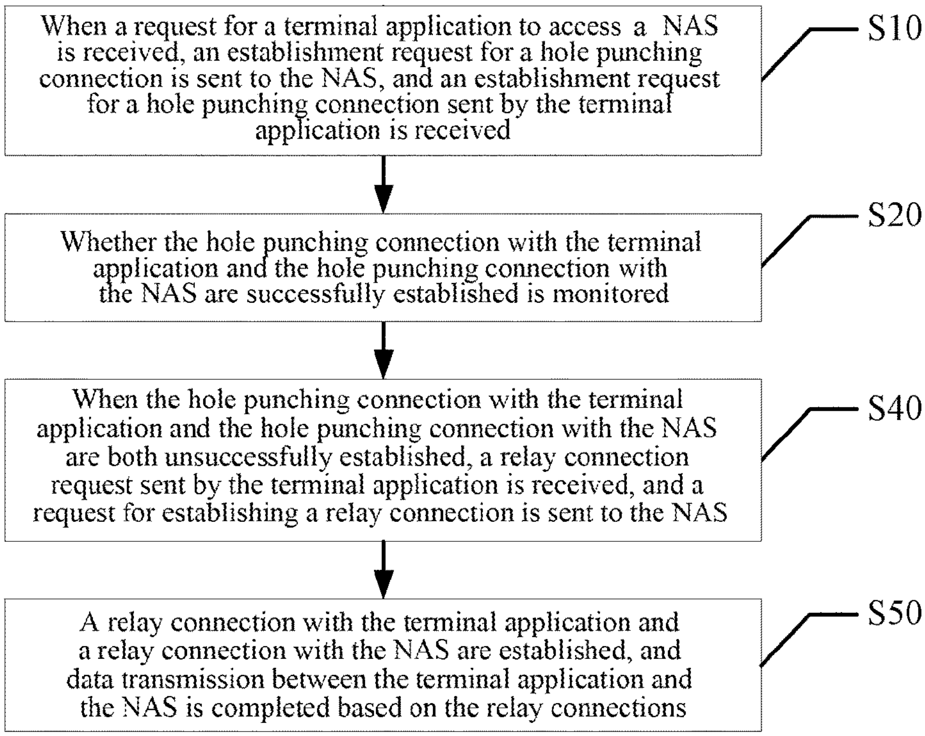
FIG. 10 illustrates a flowchart of a method for a terminal application to access a NAS according to embodiment two of the present disclosure.

Referring to FIG. 10, it illustrates a flowchart of a method for a terminal application to access a NAS according to embodiment two of the present disclosure. Based on embodiment one of the method for the terminal application to access the NAS, after the step S20, the method may further include the following steps S40-S50.

In step S40, when the hole punching connection with the terminal application and the hole punching connection with the NAS are both unsuccessfully established, a relay connection request sent by the terminal application is received, and a request for establishing a relay connection is sent to the NAS.

As long as one of the hole punching connection with the terminal application and the hole punching connection with the NAS is successfully established, the terminal application may directly interact with the NAS.

In step S50, a relay connection with the terminal application and a relay connection with the NAS are respectively established, and data transmission between the terminal application and the NAS is completed based on the relay connections.

The server monitors whether the hole punching connections with the terminal application and the NAS are successfully established. If the hole punching connections are unsuccessfully established, i.e., when the hole punching connection with the terminal application and the hole punching connection with the NAS are both unsuccessfully established, or when the NAT environments of the application terminal and the NAS are both a symmetric NAT network environment, it is judged that the hole punching connection between the NAS and the terminal application is unsuccessfully established, and data transmission between the terminal application and the NAS needs to be completed through relay connections. When the hole punching connection cannot be established or the hole punching connection is unsuccessfully established, the terminal application sends a request for establishing a relay connection to the server. The server receives the request for establishing the relay connection, and notifies the NAS to establish the relay connection with the server and establishes a relay connection with the terminal application. After the relay connections are successfully established, data transmission between the terminal application and the NAS is completed based on the relay connections.

Figure 11:
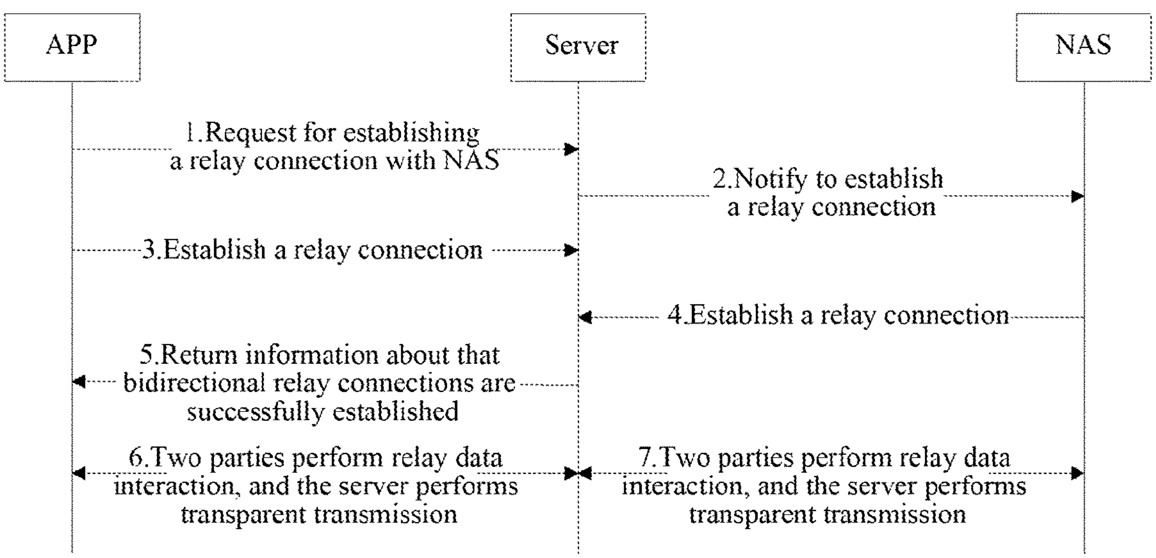
FIG. 11 illustrates a flowchart of a relay connection according to embodiment two of the present disclosure.

In an exemplary embodiment, to better describe the process of the method for a terminal application to access a NAS provided by the embodiment of the present disclosure, referring to FIG. 11, the process of a relay connection includes the following steps.

1: An APP initiates a request for establishing a relay connection with a NAS to a server.

2: The server notifies the NAS to establish a relay connection.

3: A relay connection is established between the APP and the server.

4: A relay connection is established between the NAS and the server.

5: The server makes a feedback to the APP to notify that bidirectional relay connections have already been successfully established.

6: The APP performs relay data interaction with the NAS and the server performs transparent transmission.

7: The NAS performs relay data interaction with the APP and the server performs transparent transmission.

In this embodiment, when the hole punching connection cannot be established between the terminal application and the NAS, data transmission between the terminal application and the NAS is completed by establishing relay connections, such that modes of data transmission between the terminal application and the NAS are diversified and data transmission between the terminal application and the NAS is effectively guaranteed.

Executive subjects of the methods for the terminal application to access the NAS, provided by embodiment one and embodiment two, may be both the server. In an exemplary embodiment, the method for the terminal application to access the NAS may be implemented by a program for a client terminal application to access a NAS installed on the server. Herein, the server includes but not limited to electronic devices such as a detection server, a monitoring server or a computer having a strong data processing capacity.

Embodiment Three

Corresponding to the method for the terminal application to access the NAS, the embodiment of the present disclosure further provides an apparatus for a terminal application to access a NAS.

Figure 12:
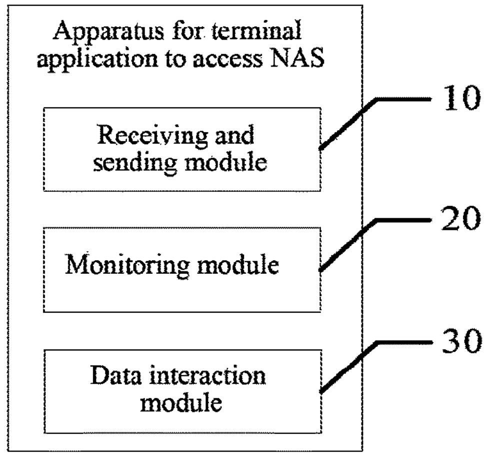
FIG. 12 illustrates a schematic diagram of function modules of an apparatus for a terminal application to access a NAS according to embodiment three of the present disclosure.

Referring to FIG. 12, it illustrates a schematic diagram of function modules of an apparatus for a terminal application to access a NAS according to embodiment three of the present disclosure.

In this embodiment, the apparatus for the terminal application to access the NAS includes a receiving and sending module 10, a monitoring module 20 and a data interaction module 30.

The receiving and sending module 10 is configured to, when a request for a terminal application to access a NAS is received, send an establishment request for a hole punching connection to the NAS, and receive an establishment request for a hole punching connection sent by the terminal application.

One detection server (i.e., an apparatus for a terminal application to access a NAS) is provided. The terminal application may complete the establishment of the hole punching connection with the NAS through the detection server, and complete data transmission between the terminal application and the NAS based on the established hole punching connection to realize the access of the terminal application to the NAS.

When a terminal user needs to access a NAS deployed in an internal network, a request for accessing the NAS is sent to the server. The server judges whether the terminal application has already established a hole punching connection with the NAS. When the terminal application has already established the hole punching connection with the NAS, data transmission between the terminal application and the NAS may be completed directly through the established hole punching connection. When the hole punching connection has not been established, an establishment request for a hole punching connection with the NAS is initiated to the server. After the server receives the request for establishing the hole punching connection with the NAS, the server sends an establishment request for a hole punching connection to the NAS and receives an establishment request for a hole punching connection sent by the terminal application, herein the establishment request is a request for establishing a hole punching connection with the server. The server establishes the hole punching connection with the NAS and establishes the hole punching connection with the terminal application.

The monitoring module 20 is configured to monitor whether the hole punching connection with the terminal application and the hole punching connection with the NAS are successfully established.

The server establishes the hole punching connection with the terminal application, and establishes the hole punching connection with the NAS. The server notifies the terminal application of information including the public network IP and port of the NAS for hole punching and the public network IP and port of the terminal application for hole punching, and notifies the NAS of information including the public network IP and port of the NAS for hole punching and the public network IP and port of the terminal application for hole punching.

Figure 13:
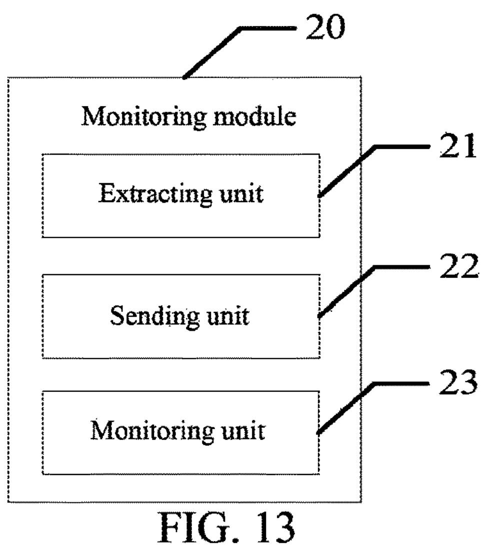
FIG. 13 illustrates a schematic diagram of refined function modules of a monitoring module in FIG. 12.
Figure 14:
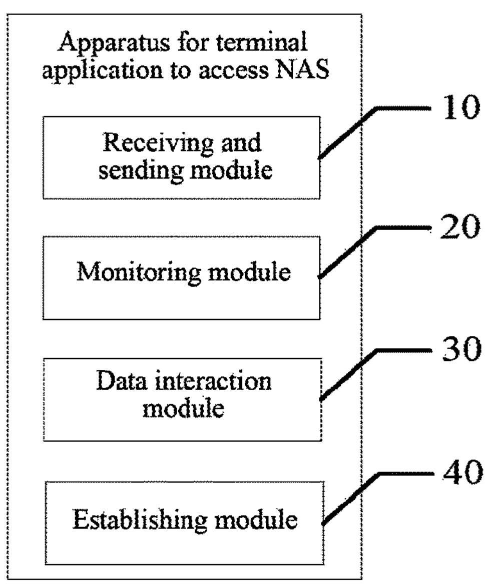
FIG. 14 illustrates a schematic diagram of function modules of an apparatus for a terminal application to access a NAS according to embodiment four of the present disclosure.

Referring to FIG. 13, the monitoring module 20 includes an extracting unit 21, a sending unit 22 and a monitoring unit 23.

The extracting unit 21 is configured to extract information about a port of the NAS for establishing the hole punching connection.

The sending unit 22 is configured to send the information about the port of the NAS for establishing the hole punching connection to the terminal application such that the terminal application monitors a port of the terminal application for establishing the hole punching connection and sends a hole punching connection request to the port of the NAS for establishing the hole punching connection.

The monitoring unit 23 is configured to, when the terminal application monitors that the port of the terminal application for establishing the hole punching connection has a connection which is established and/or the hole punching connection corresponding to the hole punching connection request sent to the NAS is successfully established, judge that the hole punching connection with the terminal application is successfully established.

The terminal application is bound to a local hole punching port and monitors the local hole punching port, and simultaneously initiates a hole punching connection request to the hole punching port of the NAS. The terminal application checks whether the monitored hole punching port has a connection which is established, and simultaneously checks whether the hole punching connection initiated to the NAS is successfully established, and it is judged that the hole punching connection with the NAS is successfully established when one of the two is successfully established. For example, when the monitored hole punching port has a connection which is established or the hole punching connection initiated to the NAS is successfully established, it is judged that the hole punching connection with the NAS is successfully established. Information about that the hole punching connection with the NAS is successfully established is fed back to the server to inform the server about the monitored situation of the establishment of the hole punching connection with the NAS.

The extracting unit 21 is further configured to extract information about a port of the terminal application for establishing the hole punching connection.

The sending unit 22 is further configured to send the information about the port of the terminal application for establishing the hole punching connection to the NAS such that the NAS detects a port of the NAS for establishing the hole punching connection and sends a hole punching connection request to the port of the terminal application for establishing the hole punching connection.

The monitoring unit 23 is further configured to, when the NAS monitors that the port of the NAS for establishing the hole punching connection has a connection which is established and/or the hole punching connection corresponding to the hole punching connection request sent to the terminal application is successfully established, judge that the hole punching connection with the NAS is successfully established.

The NAS is bound to a local hole punching port and monitors the local hole punching port, and simultaneously initiates a hole punching connection request to the hole punching port of the terminal application. The NAS checks whether the monitored hole punching port has a connection which is established and simultaneously checks whether the hole punching connection initiated to the terminal application is successfully established, and it is judged that the hole punching connection with the terminal application is successfully established when one of the two is successfully established. For example, when the monitored hole punching port has a connection which is established or the hole punching connection initiated to the terminal application is successfully established, it is judged that the hole punching connection with the terminal application is successfully established. Information about that the hole punching connection with the terminal application is successfully established is fed back to the server to inform the server about the monitored situation of the establishment of the hole punching connection with the terminal application. In this embodiment, by simultaneously initiating the hole punching connections with the terminal application and the NAS to try traversing, the traversing efficiency and the success rate of the hole punching connection are improved.

In an exemplary embodiment, the monitoring unit 23 is further configured to, when a NAT environment of the application terminal and a NAT environment of the NAS is a symmetric NAT environment, judge that the hole punching connection with the terminal application and the hole punching connection with the NAS are unsuccessfully established.

The establishment of the above-mentioned hole punching connections has certain requirements on NAT network environments. For example, if one of the terminal application and the NAS is in an asymmetric NAT environment, the hole punching connection can be successfully established. If the terminal application and the NAS are both in a symmetric NAT network environment, the hole punching connection cannot be successfully established. When the server determines that the NAT environment of the terminal application and the NAT environment of the NAS are both the symmetric NAT environment, the establishment of the hole punching connection between the NAS and the terminal application cannot be completed, i.e., it is judged that the hole punching connection with the terminal application and the hole punching connection with the NAS are unsuccessfully established.

In other embodiments of the present disclosure, what may further be included is that before the server establishes the hole punching connection with the terminal application and establishes the hole punching connection with the NAS, the server firstly determines whether the NAT environments of the NAS and the terminal application are suitable for the establishment of the hole punching connections. If not, hole punching connections will not be established. If yes, the hole punching connections will be established, and then whether the hole punching connections can be successfully established is judged.

The data interaction module 30 is configured to, after the hole punching connection with the terminal application and the hole punching connection with the NAS are successfully established, complete data transmission between the terminal application and the NAS based on the successfully established hole punching connections.

After the hole punching connection between the terminal application and the NAS is successfully established, the hole punching connection may be used for data transmission, i.e., P2P data transmission between the terminal application and the NAS is performed. By establishing the hole punching connection between the terminal application and the NAS, the NAS may be remotely accessed, and only one detection server needs to be added, thereby reducing the cost in accessing the NAS.

To better describe the process of the method for the terminal application to access the NAS provided by the embodiment of the present disclosure, referring to FIG. 9, the process of a hole punching connection includes the following steps.

1: When the terminal application APP needs to access the NAS, the terminal application APP initiates an establishment request for a hole punching connection with the NAS to the server.

2: The server notifies the NAS to establish a hole punching connection.

3: The APP establishes a hole punching connection with the server.

4: The server extracts information about a public network IP and port for an APP hole punching connection.

5: The NAS establishes a hole punching connection with the server.

6: The server extracts information about a public network IP and port for a NAS hole punching connection.

7: The server notifies the NAS of information including the public network IP and port of the NAS for hole punching, the public network IP and port of the APP for hole punching, etc.

8: The server notifies the APP of information including the public network IP and port of the NAS for hole punching, the public network IP and port of the APP for hole punching, etc.

9: The APP is bound to a local hole punching port and monitors the local hole punching port, and simultaneously initiates a connection request to the hole punching port of the NAS.

10: The NAS is bound to a local hole punching port and monitors the local hole punching port, and simultaneously initiates a connection request to the hole punching port of the APP (there is no sequence for step 9 and step 10).

11: The APP checks whether the monitored hole punching port has a connection which is established, and simultaneously checks whether the hole punching connection is successfully established, and it is ok as long as one of the two is successfully established.

12: The NAS checks whether the monitored hole punching port has a connection which is established, and simultaneously checks whether the hole punching connection is successfully established, and it is ok as long as one of the two is successfully established.

13: If the hole punching connection between the APP and the NAS is successfully established (no matter the hole punching connection of any one of the two parties is successfully established), data transmission may be performed by using the connection.

14: After the hole punching connection is successfully established, P2P data transmission is performed between the APP and the NAS.

One server is deployed on a public network to provide hole punching and relay services, and acts as a "intermediary" between the mobile phone APP and the NAS. A home NAS is deployed under a home gateway, and sends a UDP heartbeat keep-alive packet to the server, and thus the server can obtain the public network IP address and port of the NAS after the NAT. If the server wants to request to access the NAS, a packet is sent to the above-mentioned IP address and port. When the mobile phone APP wants to access the NAS, firstly a hole punching process is tried to establish a P2P (Peer to Peer) connection with the NAS and perform data transmission. If the P2P connection is unsuccessfully established, data transmission between the mobile phone APP and the NAS is performed through a relay connection process.

In this embodiment, by establishing the hole punching connection through one detection server between the terminal application and the NAS and further completing data transmission between the terminal application and the NAS through the hole punching connection, the access of the terminal application to the internal network NAS is realized, and the cost in accessing the NAS is reduced and the efficiency of accessing the NAS is improved.

Embodiment Four

Figure 1:
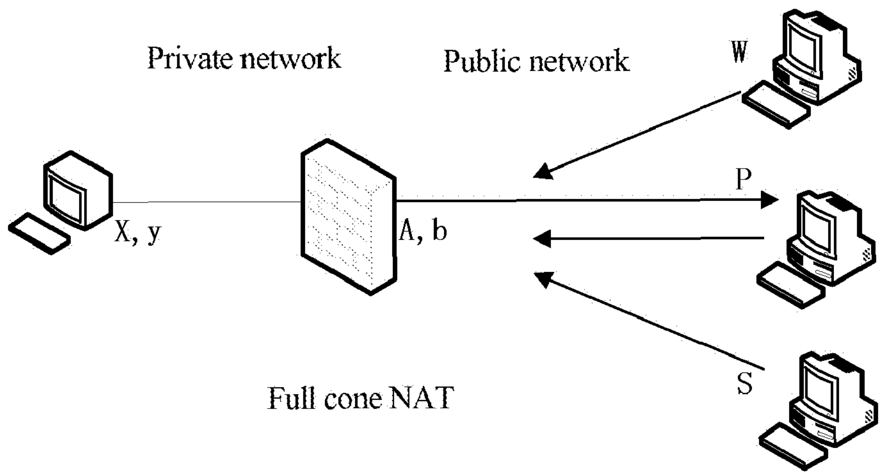
FIG. 1 illustrates a schematic diagram of interaction in one embodiment of full cone NAT in the related technology.
Figure 2:
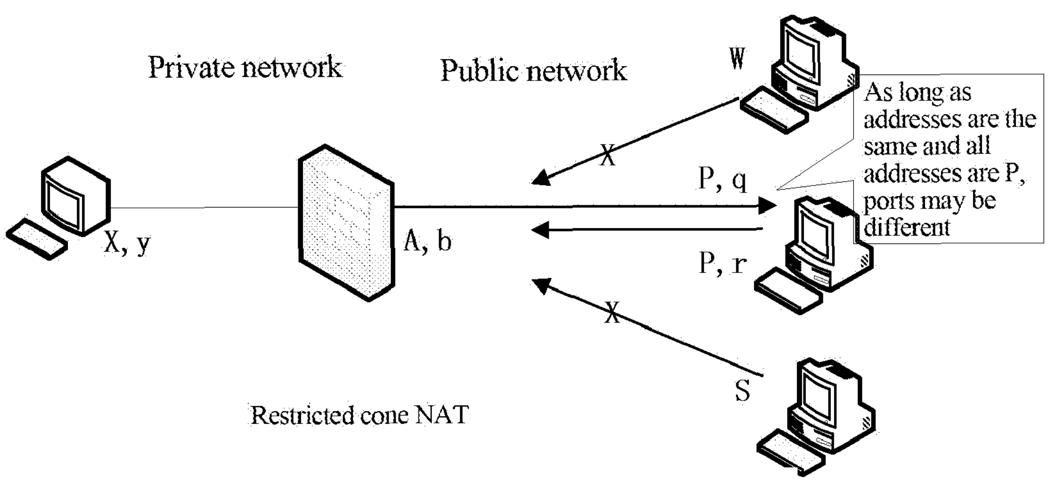
FIG. 2 illustrates a schematic diagram of interaction in one embodiment of restricted cone NAT in the related technology.
Figure 3:
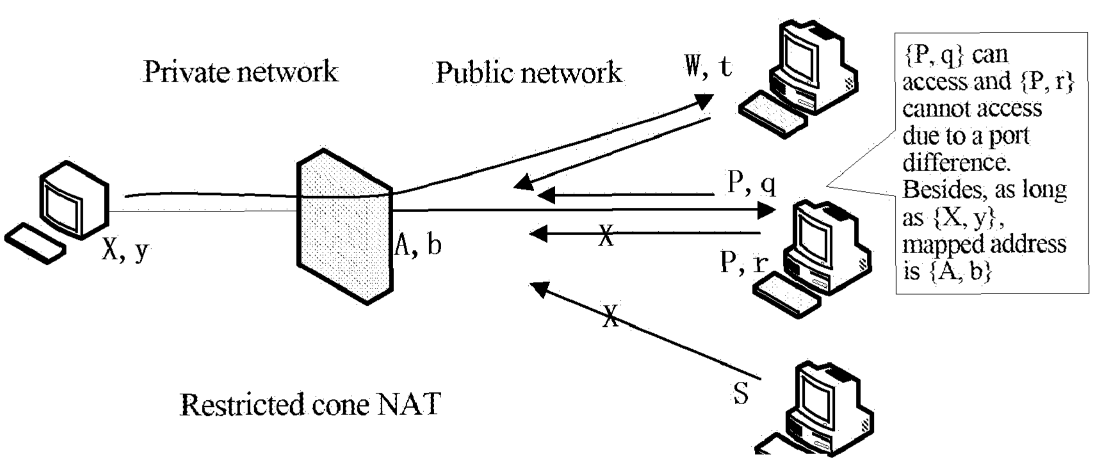
FIG. 3 illustrates a schematic diagram of interaction in one embodiment of port restricted cone NAT in the related technology.
Figure 4:
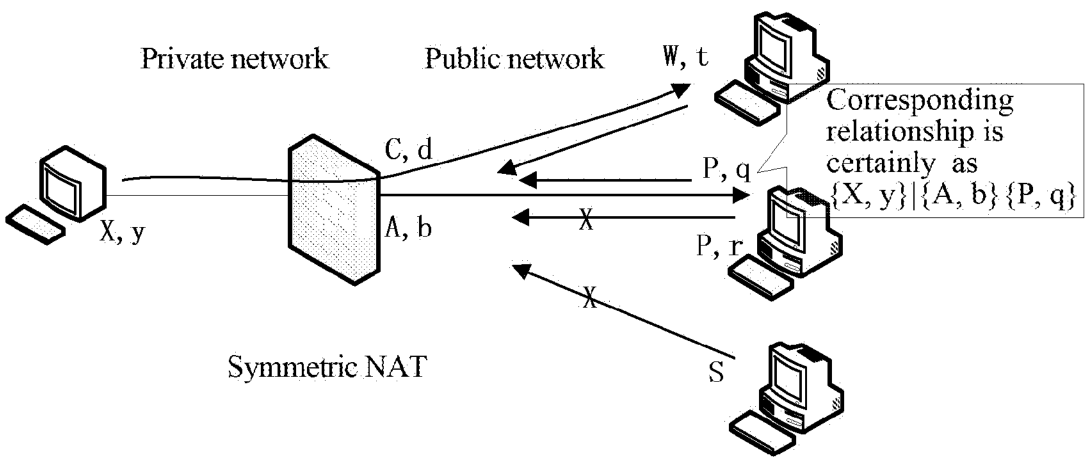
FIG. 4 illustrates a schematic diagram of interaction in one embodiment of symmetric NAT in the related technology.

Referring to FIG. 4, it illustrates a schematic diagram of function modules of an apparatus for a terminal application to access a NAS according to embodiment four of the present disclosure. The apparatus further includes an establishing module 40.

The receiving and sending module 10 is further configured to, when the hole punching connection with the terminal application and the hole punching connection with the NAS are both unsuccessfully established, receive a relay connection request sent by the terminal application and send a request for establishing a relay connection to the NAS.

The establishing module 40 is configured to establish a relay connection with the terminal application and a relay connection with the NAS respectively.

The data interaction module 30 is further configured to complete data transmission between the terminal application and the NAS based on the relay connections.

The server monitors whether the hole punching connections with the terminal application and the NAS are successfully established. If the hole punching connections are unsuccessfully established, i.e., when the hole punching connection with the terminal application and the hole punching connection with the NAS are both unsuccessfully established, or when the NAT environments of the application terminal and the NAS are both the symmetric NAT network environment, it is judged that the hole punching connection between the NAS and the terminal application is unsuccessfully established, and data transmission between the terminal application and the NAS needs to be completed through relay connections. When the hole punching connection cannot be established or the hole punching connection is unsuccessfully established, the terminal application sends a request for establishing a relay connection to the server, the server receives the request for establishing the relay connection, and notifies the NAS to establish the relay connection with the server, and establishes a relay connection with the terminal application. After the relay connections are successfully established, data transmission between the terminal application and the NAS is completed based on the relay connections.

In an exemplary embodiment, to better describe the process of the method for the terminal application to access the NAS provided by the embodiment of the present disclosure, referring to FIG. 11, the process of a relay connection in the establishing module 40 includes the following steps.

1: An APP initiates a request for establishing a relay connection with a NAS to a server.

2: The server notifies the NAS to establish a relay connection.

3: A relay connection is established between the APP and the server.

4: A relay connection is established between the NAS and the server.

5: The server makes a feedback to the APP to notify that bidirectional relay connections have already been successfully established.

6: The APP performs relay data interaction with the NAS and the server performs transparent transmission.

7: The NAS performs relay data interaction with the APP and the server performs transparent transmission.

In this embodiment, when the hole punching connection cannot be established between the terminal application and the NAS, data transmission between the terminal application and the NAS is completed by establishing relay connections, such that modes of data transmission between the terminal application and the NAS are diversified and data transmission between the terminal application and the NAS is effectively guaranteed.

One skilled in the art can understand that all or partial steps in the above-mentioned methods may be completed by relevant hardware instructed by a program, and the program may be stored in a computer readable storage medium such as a read-only memory, a magnetic disc or a compact disc or the like. Optionally, all or partial steps in the above-mentioned embodiments may also be implemented by using one or more integrated circuits. Correspondingly, each module/unit in the above-mentioned embodiments may be implemented by means of hardware, and may also be implemented by means of a software function module. The present disclosure is not limited to combinations of hardware and software in any specific form.

INDUSTRIAL APPLICABILITY

By establishing the hole punching connection through one detection server between the terminal application and the NAS and further completing data transmission between the terminal application and the NAS through the hole punching connection, the embodiments of the present disclosure realize the access of the terminal application to the internal network NAS, reduces the cost in accessing the NAS and improves the efficiency of accessing the NAS.

What we claim is:

1. A method for a terminal application to access a Network Attached Storage (NAS) comprising following steps implemented by a processor of an apparatus for the terminal application to access the NAS:

when receiving a request for the terminal application to access the NAS, sending a first establishment request for a first hole punching connection between the apparatus and the NAS to the NAS, and receiving a second establishment request for a second hole punching connection between the apparatus and the terminal application sent by the terminal application, wherein the terminal application and the NAS simultaneously initiate the first hole punching connection and the second hole punching connection;

monitoring whether the first hole punching connection and the second hole punching connection are successfully established; and after the second hole punching connection and the first hole punching connection are successfully established, performing data transmission between the terminal application and the NAS based on successfully established hole punching connections, wherein monitoring whether the second hole punching connection is successfully established comprises:

extracting information about a port and a public IP address of the NAS for establishing a hole punching connection;

sending the information about the port of the NAS for establishing the hole punching connection to the terminal application, wherein the terminal application monitors a port of the terminal application for establishing the hole punching connection and sends a hole punching connection request to the port of the NAS for establishing the hole punching connection; and when the terminal application monitors that the port of the terminal application for establishing the hole punching connection has a connection which is established or a hole punching connection corresponding to the hole punching connection request sent to the port of the NAS is successfully established, judging that the second hole punching connection is successfully established, and feeding back information about that the second hole punching connection is successfully established to the apparatus;

wherein monitoring whether the first hole punching connection is successfully established comprises:

extracting information about the port and a public IP address of the terminal application for establishing the hole punching connection;

sending the information about the port of the terminal application for establishing the hole punching connection to the NAS, wherein the NAS checks whether the port of the NAS for establishing the hole punching connection has a connection which is established and the NAS sends a hole punching connection request to the port of the terminal application for establishing the hole punching connection; and when the NAS monitors that the port of the NAS for establishing the hole punching connection has a connection which is established or a hole punching connection corresponding to the hole punching connection request sent to the port the terminal application is successfully established, determining that the first hole punching connection is successfully established, and feeding back information about that the first hole punching connection is successfully established to the apparatus, wherein, before the performing data transmission between the terminal application and the NAS based on successfully established hole punching connections, the method further comprises:

when a Network Address Translation (NAT) environment of the terminal application and a NAT environment of the NAS are a symmetric NAT environment, judging that the second hole punching connection and the first hole punching connection are unsuccessfully established, wherein the method further comprises:

when the second hole punching connection and the first hole punching connection are both unsuccessfully established, receiving a relay connection request sent by the terminal application and sending a request for establishing a relay connection to the NAS; and establishing a relay connection with the terminal application and a relay connection with the NAS respectively, and performing data transmission between the terminal application and the NAS based on the relay connections.

2. The method for a terminal application to access a NAS according to claim 1, wherein the method further comprises:

when the second hole punching connection and the first hole punching connection are both unsuccessfully established, receiving a relay connection request sent by the terminal application and sending a request for establishing a relay connection to the NAS; and establishing a relay connection with the terminal application and a relay connection with the NAS respectively, and completing data transmission between the terminal application and the NAS based on the relay connections.

3. An apparatus for a terminal application to access a Network Attached Storage (NAS) comprising a first processor and a first storage device, wherein the first storage device stores first processor-executable programs, and the first processor-executable programs comprise:

a receiving and sending module, executed by the first processor, configured to, when receiving a request for the terminal application to access the NAS, send a first establishment request for a first hole punching connection between the apparatus and the NAS to the NAS, and receive a second establishment request for a second hole punching connection between the apparatus and the terminal application sent by the terminal application, wherein the terminal application and the NAS simultaneously initiate the first hole punching connection and the second hole punching connection;

a monitoring module configured to, monitor whether the first hole punching connection and the second hole punching connection are successfully established, and a data interaction module, executed by the first processor, configured to, after the second hole punching connection and the first hole punching connection are successfully established, perform data transmission between the terminal application and the NAS based on successfully established hole punching connections, wherein the monitoring module comprising a second processor and a second storage device, wherein the second storage device stores second processor-executable programs, and the second processor-executable programs comprise an extracting unit, a sending unit, and a monitoring unit, wherein:

the extracting unit is configured to extract information about a port and a public IP address of the NAS for establishing a hole punching connection;

the sending unit is configured to send the information about the port of the NAS for establishing the hole punching connection to the terminal application, wherein the terminal application monitors a port of the terminal application for establishing the hole punching connection and sends a hole punching connection request to the port of the NAS for establishing the hole punching connection; and the monitoring unit is configured to, when the terminal application monitors that the port of the terminal application for establishing the hole punching connection has a connection which is established or a hole punching connection corresponding to the hole punching connection request sent to the port of the NAS is successfully established, judge that the second hole punching connection is successfully established, and feedback information about that the second hole punching connection is successfully established to the data interaction module;

wherein the extracting unit is further configured to extract information about the port and a public IP address of the terminal application for establishing the hole punching connection;

the sending unit is further configured to send the information about the port of the terminal application for establishing the hole punching connection to the NAS, wherein the NAS checks whether the port of the NAS for establishing the hole punching connection has a connection which is established and the NAS sends a hole punching connection request to the port of the terminal application for establishing the hole punching connection; and the monitoring unit is further configured to, when the NAS monitors that the port of the NAS for establishing the hole punching connection has a connection which is established or a hole punching connection corresponding to the hole punching connection request sent to the port of the terminal application is successfully established, judge that the first hole punching connection is successfully established, and feedback information about that the first hole punching connection is successfully established to the data interaction module;

the monitoring unit is further configured to, when a Network Address Translation (NAT) environment of the terminal application and a NAT environment of the NAS is a symmetric NAT environment, judge that the second hole punching connection and the first hole punching connection are unsuccessfully established, wherein the first processor-executable programs further comprises an establishing module executed by the first processor;

the receiving and sending module is further configured to, when the second hole punching connection and the first hole punching connection are both unsuccessfully established, receive a relay connection request sent by the terminal application and send a request for establishing a relay connection to the NAS;

the establishing module is configured to establish a relay connection with the terminal application and a relay connection with the NAS respectively; and the data interaction module is further configured to perform data transmission between the terminal application and the NAS based on the relay connections.

4. A non-transitory computer-readable storage medium which stores a computer program, wherein the computer program comprises program instructions, and when the program instructions are executed by an apparatus for a terminal application to access a Network Attached Storage (NAS), the apparatus performs following steps:

when receiving a request for the terminal application to access the NAS, sending a first establishment request for a first hole punching connection between the apparatus and the NAS to the NAS, and receiving a second establishment request for a second hole punching connection between the apparatus and the terminal application sent by the terminal application, wherein the terminal application and the NAS simultaneously initiate the first hole punching connection and the second hole punching connection;

monitoring whether the first hole punching connection and the second hole punching connection are successfully established; and after the second hole punching connection and the first hole punching connection are successfully established, performing data transmission between the terminal application and the NAS based on successfully established hole punching connections, wherein monitoring whether the second hole punching connection is successfully established comprises:

extracting information about a port and a public IP address of the NAS for establishing a hole punching connection;

sending the information about the port of the NAS for establishing the hole punching connection to the terminal application, wherein the terminal application monitors a port of the terminal application for establishing the hole punching connection and sends a hole punching connection request to the port of the NAS for establishing the hole punching connection; and when the terminal application monitors that the port of the terminal application for establishing the hole punching connection has a connection which is established or a hole punching connection corresponding to the hole punching connection request sent to the port of the NAS is successfully established, judging that the second hole punching connection is successfully established, and feeding back information about that the second hole punching connection is successfully established to the apparatus;

wherein monitoring whether the first hole punching connection is successfully established comprises:

extracting information about the port and a public IP address of the terminal application for establishing the hole punching connection;

sending the information about the port of the terminal application for establishing the hole punching connection to the NAS, wherein the NAS checks whether the port of the NAS for establishing the hole punching connection has a connection which is established and the NAS sends a hole punching connection request to the port of the terminal application for establishing the hole punching connection; and when the NAS monitors that the port of the NAS for establishing the hole punching connection has a connection which is established or a hole punching connection corresponding to the hole punching connection request sent to the port the terminal application is successfully established, determining that the first hole punching connection is successfully established, and feeding back information about that the first hole punching connection is successfully established to the apparatus, wherein, before the performing data transmission between the terminal application and the NAS based on successfully established hole punching connections, the steps further comprises:

when a Network Address Translation (NAT) environment of the terminal application and a NAT environment of the NAS are a symmetric NAT environment, judging that the second hole punching connection and the first hole punching connection are unsuccessfully established, when the second hole punching connection and the first hole punching connection are both unsuccessfully established, receiving a relay connection request sent by the terminal application and sending a request for establishing a relay connection to the NAS; and establishing a relay connection with the terminal application and a relay connection with the NAS respectively, and performing data transmission between the terminal application and the NAS based on the relay connections.

* * * * *